United States Patent [19]

Cutler et al.

[11] 4,141,740
[45] Feb. 27, 1979

[54] SOLID SOLUTION AND PROCESS FOR PRODUCING A SOLID SOLUTION

[75] Inventors: Ivan B. Cutler, Centerville, Utah; Patrick D. Miller, Pittsburgh, Pa.

[73] Assignee: University of Utah, Salt Lake City, Utah

[21] Appl. No.: 880,414

[22] Filed: Feb. 23, 1978

[51] Int. Cl.$^2$ .................. C04B 35/52; C04B 35/58
[52] U.S. Cl. ................... 106/44; 106/73.4; 106/73.5
[58] Field of Search ............ 106/44, 73.4, 73.5

[56] References Cited

U.S. PATENT DOCUMENTS

| | | | |
|---|---|---|---|
| 3,259,509 | 7/1966 | Matkovich et al. | 106/44 |
| 3,890,250 | 6/1975 | Richerson | 106/44 |
| 3,895,219 | 7/1975 | Richerson | 106/44 |
| 3,974,106 | 8/1976 | Richerson | 106/44 |

*Primary Examiner*—James Poer

[57] ABSTRACT

A solid solution and a process for producing a solid solution, the solid solution including at least the compounds: silicon carbide and aluminum oxycarbide, and also aluminum nitride. The new material including all three compounds is referred to by the acronym, SiCA-lON, which is a coined term consisting of the chemical abbreviations for the elements present in the solid solution. The solid solution is obtained by heating an intimate mixture of reactants above about 1550° C. The silicon carbide in the solid solution has the alpha or hexagonal structure and the aluminum nitride has the wurtzite or hexagonal structure. The solid solution is characterized by the substantial absence of iron or other impurities that tend to encourage the formation of silicon carbide as a separate phase having a beta or cubic structure.

14 Claims, 2 Drawing Figures

SOLID SOLUTION AND PROCESS FOR PRODUCING A SOLID SOLUTION

THE BACKGROUND

1. Field of the Invention

This invention relates to solid solutions and, more particularly, to a solid solution and process for producing a solid solution, the solid solution including at least silicon carbide and aluminum oxycarbide and, additionally, aluminum nitride.

2. The Prior Art

Structural ceramic materials which retain their strengths to temperatures on the order of 1400° C. to 1500° C. are desirable for their application in high temperature environments including those encountered in energy conversion devices such as gas turbines, diesel superchargers, sterling engines and the like. Currently, silicon carbide and silicon nitride are the leading contending materials for use in gas turbine engines. However, the fabrication of gas turbine engine parts from silicon carbide and silicon nitride is very expensive. One possibility for lowering fabrication costs is to sinter the parts from a preformed silicon carbide or silicon nitride powder.

These two materials should be considered as a family of ceramics because a variety of processing fabrication techniques can be applied. For example, the hot-pressed material has the highest strength while the reaction-sintered materials have the lowest strength, but are best for fabricating large or complex shapes. Hot-pressing is carried out at 1700° C. to 2000° C., using fine-grained powder (approximately 0.1 micrometer particle size). Additives are required to aid densification. Magnesium oxide or yttrium oxide are usually favored as the additives for silicon nitride, while aluminum oxide, boron and carbon are favored for silicon carbide.

In the process involving reaction-sintered silicon nitride, a silicon pre-form is prepared by slip casting, injection molding, or isostatic pressing. The silicon in the pre-form is thereafter converted to silicon nitride by reaction with nitrogen at 1200° C. to 1400° C. for several days under a nitrogen atmosphere.

Reaction-sintered silicon carbide depends upon the reaction of silicon carbide and graphite with silicon, or more simply, on the reaction of carbon with silicon. Advantageously, extremely complex shapes can be fabricated by this method. Furthermore, recent developments in the ability to sinter silicon carbide to 98% theoretical density and the anticipation that it will soon be possible to sinter silicon nitride to similar low-porosity levels is expected to lead to other new uses for these materials.

Silicon carbide has a variety of uses in many fields including, for example, additives in ferrous metallurgy, abrasives, refractories, heating elements, semiconductors and the like. The largest single use of silicon carbide on the basis of tonnage is as an additive in ferrous metallurgy. However, the most important application in terms of capitalizing on the properties of silicon carbide is its use as a refractory.

There are three major methods of preparing silicon carbide, (1) by carbothermal reduction of silica, (2) by the elemental reaction between silicon and carbon, and (3) by pyrolysis of silane compounds. However, the majority of silicon carbide is commercially manufactured in an Acheson furnace by the carbothermal reduction reaction by heating a mixture of sand (silica), coke (carbon) and sawdust. The process involves the formation of silicon carbide powder at lower temperatures (1500° C. to approximately 1800° C.) and subsequent recrystallization of the silicon carbide by further heating at temperatures of approximately 2000° C. or above for several days. However, both aluminum oxycarbide and aluminum nitride decompose into aluminum oxide ($Al_2O$) and carbon and also aluminum and nitrogen, respectively, at substantially lower temperatures, approximately 1900–2100° C., depending upon the particular vapor pressure. Accordingly, any aluminum or aluminum compounds present in the Acheson furnace will be volatilized and removed from the Acheson furnace along with the other gaseous by-products. This is one of the reasons that the commercially produced silicon carbide does not contain aluminum nitride or aluminum oxycarbide. Neither is silicon carbide found in solid solution with aluminum oxycarbide and aluminum nitride when these compounds are produced by other processes.

The resultant product of the Acheson furnace is an intergrown crystalline mass of silicon carbide having the alpha structure. The difference between the formation of the alpha structure silicon carbide and the beta structure is probably controlled by the impurities or materials in solid solution with the silicon carbide rather than by the temperature. For example, one researcher has noted that aluminum additions in a nitrogen overpressure beyond 1% can result in an extensive formation of alpha structure silicon carbide in the solid solution. However, the problem of growing crystals of silicon carbide is a very difficult problem since the temperatures involved would be at the melting point (if under an overpressure) and, therefore, the results obtained by the researchers are only generally suggested results for someone willing to grow crystals of silicon carbide under pressure. Other experimental work has also been performed by other researchers which was conducted at fairly low temperatures in the order of 1500° C. to 2000° C. by chemical vapor deposition techniques.

Previous experience with the formation of silicon carbide by the carbothermal reduction of silica has been rather extensive and has readily confirmed that (1) silicon carbide is formed by a gaseous phase reaction between carbon and silica, (2) that the quantity of available surface area of both specie (carbon and silica) is important and (3) that the reaction is catalyzed by iron. Importantly, however, we have also determined through our experiments, that when working with very high purity chemicals, particularly in the absence of iron or other transition metals, there is evidence of alpha silicon carbide being formed. On the other hand, when the reactants are doped with even a small amount of iron (0.1% up to 1%, by weight) beta silicon carbide is easily formed.

Aluminum nitride has a density and a coefficient of thermal expansion very near to that of silicon carbide as well as having a very high melting point. Upon crystallization, aluminum nitride forms into the wurtzite or hexagonal structure. Additionally, like silicon carbide, aluminum nitride does not melt easily unless there is an overpressure above about 1 atmosphere and decomposes to aluminum and nitrogen at about 2000° C.

Previous studies of the aluminum oxide/aluminum carbide system have noted that there is one specie of oxycarbide that is similar in structure to aluminum nitride. This is the $Al_2OC$ oxycarbide which as the same wurtzite structure as aluminum nitride. This aluminum oxycarbide has also been found to form a complete solid solution with aluminum nitride. The present studies which resulted in this invention were concerned about the ability to form this particular oxycarbide in the absence of a small amount of nitrogen. The experiments of the present invention have resulted in the formation of the $Al_2OC$ oxycarbide from aluminum oxide by carbon reduction in the absence of nitrogen.

A recent discovery has been made of a new group of materials called the SiAlONs. The term "SiAlON" is an acronym derived from the chemical symbols of the constituents silicon, aluminum, oxygen and nitrogen. For example, see my U.S. Pat. No. 3,960,581 issued June 1, 1976 for PROCESS FOR PRODUCING A SOLID SOLUTION OF ALUMINUM OXIDE IN SILICON NITRIDE. The SiAlONs are, however, only a small part of a vast family of silicon metal oxynitrides that are isomorphous with known minerals. Advantageously, the SiAlONs offer a greater flexibility in processing than do silicon nitride and silicon carbide, but because they are new materials, they have received comparatively little attention.

In recognition of the interest in high-strength ceramic materials having the desired physical properties, it would be an advantage in the art to provide a ceramic material consisting of a solid solution of silicon carbide, aluminum nitride and aluminum oxycarbide. Such a solid solution and process for producing the same is disclosed and claimed herein.

BRIEF SUMMARY AND OBJECTS OF THE INVENTION

The present invention relates to a new material and process for producing the new material, the new material being in the form of a solid solution of at least silicon carbide and aluminum oxycarbide and may also include aluminum nitride. The solid solution is produced by reacting an intimate mixture of silica, aluminum oxide and carbon under a controlled atmosphere. The solid solution contains the alpha form (hexagonal structure) of silicon carbide and, where applicable, the wurtzite form (hexagonal structure) of aluminum nitride. The solid solution including all three compounds is called SiCAlON which is an acronym composed of the chemical symbols for the elements in the solid solution. Importantly, the solid solution is formed in the absence of iron or other impurities that tend to influence the formation silicon carbide having the beta or cubic structure. Beta silicon carbide forms a distinct phase and does not become part of the solid solution.

It is, therefore, a primary object of this invention to provide a solid solution of aluminum nitride, aluminum oxycarbide and silicon carbide, the silicon carbide and aluminum nitride having the hexagonal structure.

It is another object of this invention to provide improvements in the process of producing SiCAlON.

Another object of this invention is to provide a solid solution of silicon carbide and aluminum oxycarbide.

Another object of this invention is to provide improvements in the process for producing a solid solution of silicon carbide and aluminum oxycarbide.

These and other objects and features of the present invention will become more fully apparent from the following description and appended claims.

DETAILED DESCRIPTION OF THE PREFERRED EMBODIMENTS

Figure 1:
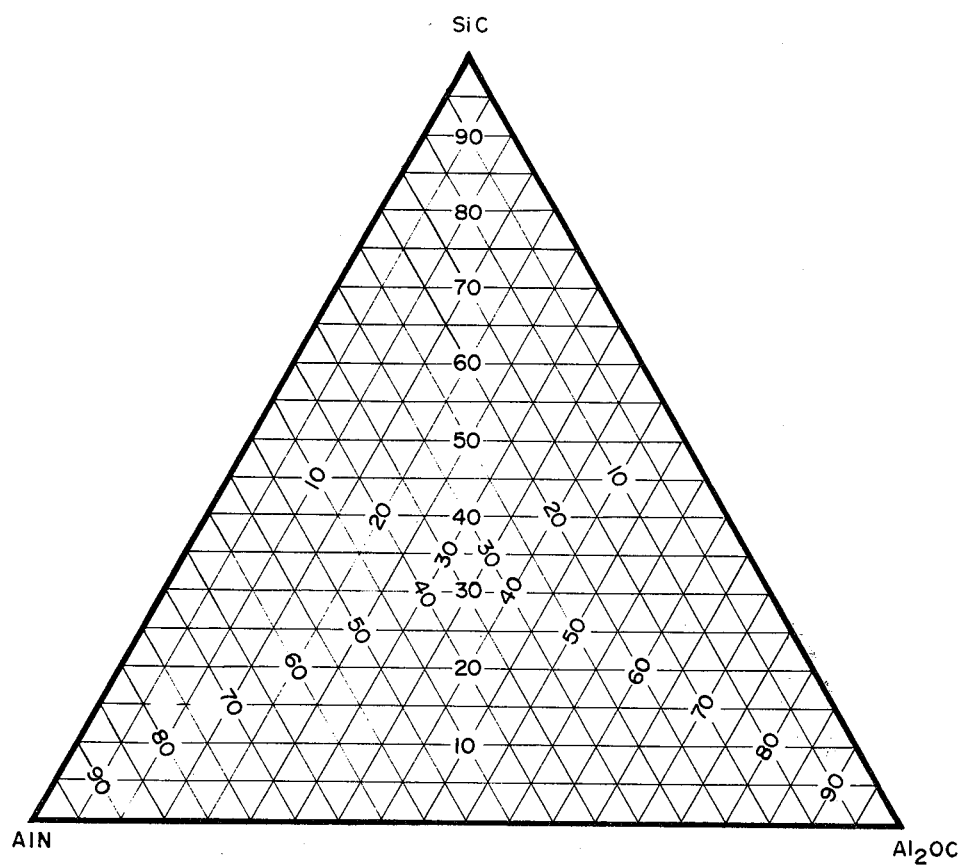
FIG. 1 is a graphical representation of the components embraced within the compositional limits of this invention.

With reference to FIG. 1, the solid solution of this invention is obtained from an intimate mixture of reactants which include a form of silicon, aluminum and carbon as well as nitrogen. Advantageously, silicon is most abundantly available as silica and aluminum as alumina. Gellation and precipitation were generally found to provide the more favorable intimate mixtures of reactants.

The intimate mixtures of reactants for one preferred embodiment of the present invention were obtained by using a dispersion of Cabosil, with starch and an aluminum salt. Cabosil is the trade name of the Cabot Corporation for a fume-type silica produced from burning silicon tetrachloride and is made up of amorphous particles of silica having a size on the order of about 100 Angstom Units in diameter.

Carbon is derived from the starch by coking the reaction mixture in the absence of oxygen. Other reactants may be added to this dispersion as soluble salts that may or may not be precipitated and gelled into place. For example, a soluble aluminum salt is precipitated as the hydroxide. In each of the experiments involved, very homogeneous solid solutions of silicon carbide, aluminum nitride and aluminum oxycarbide were formed because they were derived from the intimate reaction mixtures of silica, alumina and carbon.

EXAMPLE I

In this first example, a sample preparation for a silicon carbide-aluminum nitride-aluminum oxycarbide solid solution system was prepared. In the preparation, the samples were first weighed and added to 100 milliliters of distilled water containing about 10 milliliters of nitric acid. The Cabosil was added to the nitric acid solution with constant stirring, the nitric acid serving as a deflocculent for the Cabosil. Aluminum nitrate was dissolved in a small amount of distilled water and then added to the Cabosil dispersion.

Starch was stirred into a beaker containing between 100 and 400 milliliters of distilled water. The Cabosil-aluminum nitrate solution was added to the starch and stirred for sufficient time (about 15–30 minutes) to insure thorough mixing. Ammonium hydroxide was slowly added to the mixture, with stirring, to bring the pH to about pH 7, after which the mixture was heated on a hot plate until the starch gelled. After gellation, the mixture was dried and coked in the absence of air at about 600° C.

The coked samples were reacted in the appropriate gaseous environment for about four hours at 1600° C. The thoroughness of the reaction was checked with (1) an x-ray diffractometer and (2) the attempted dissolution in concentrated, hot sodium hydroxide while checking for ammonia evolution (very little, if any, ammonia was detected).

Table I, below, sets forth some representative reactant compositions prepared using the sample preparation technique of this Example I.

TABLE I

REACTANT COMPOSITIONS
(All quantities in grams)

| Sample No. | Cabosil | Aluminum Nitrate | Starch |
|---|---|---|---|
| 1 | 10 | 1.36 | 56 |
| 2 | 10 | 7.0 | 56 |
| 3 | 10 | 14.0 | 56 |
| 4 | 11.25 | 22.87 | 125 |
| 5 | 7.5 | 45.8 | 125 |
| 6 | 3.75 | 68.6 | 100 |
| 7 | 1.5 | 82.0 | 100 |
| 8 | 0. | 50.0 | 100 |

The results of the experimental solid solutions in Example I, as tabulated in Table I, show that there was a complete solid solution between the silicon carbide, aluminum nitride, and aluminum oxycarbide. X-ray diffraction analysis of the samples showed definite peaks for these materials in solid solution between 2 percent (2%) aluminum nitride to near 100 percent (100%) aluminum nitride. It was not possible to show 0% aluminum nitride in solid solution because the wurtzite variety of silicon carbide cannot be made without additives at 1600° C., and with no aluminum nitride in solid solution, it was impossible to show the characteristic x-ray diffraction pattern peaks. On the contrary, some other type of hexagonal silicon carbide was formed of which there are a large number of stacking fault structures. Currently, however, these other types of silicon carbide are not sufficiently characterized.

Figure 2:
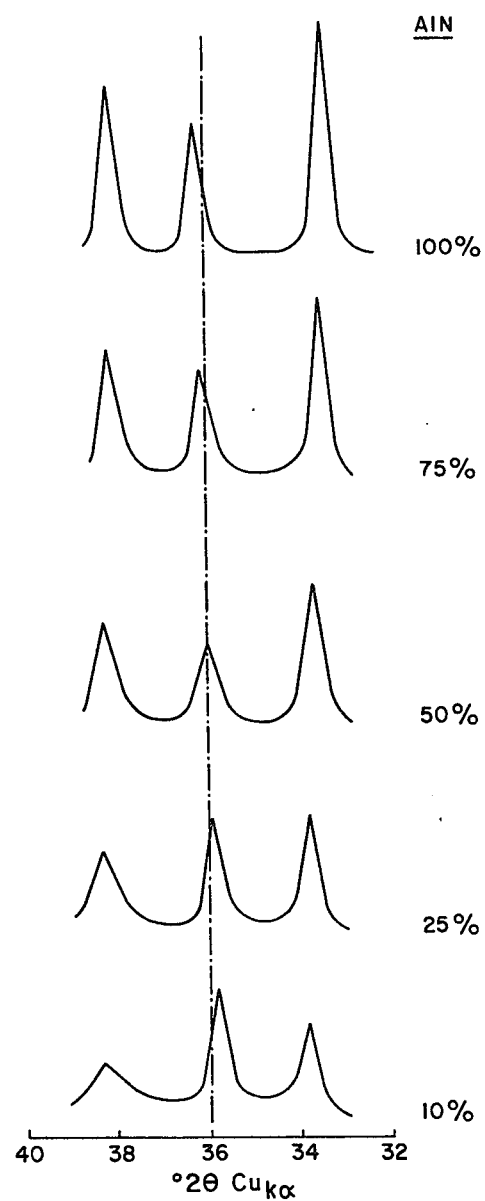
FIG. 2 is a schematic presentation of the x-ray diffraction pattern for various ratios of aluminum nitride in solid solution with silicon carbide.

With particular reference to FIG. 2, a gradual shift of the peak radiation (at about 72 degrees, using Copper K alpha radiation) was found as the composition changed from approximately 2 percent aluminum nitride (that being the lowest concentration of aluminum nitride for which radiation peaks can be readily observed as set forth hereinabove) to about 100 percent aluminum nitride. The peak shift was not linear with concentration perhaps because of such a broad range of values. However, the peak does shift over ½ degree from 2 percent up to 100 percent aluminum nitride. This shift is continuous although there is some scatter in the data obtained. Regular diffractometer procedures were used to obtain the data set forth hereinbefore; hence there is a great deal of variation, but the data is sufficiently accurate to show the principle behind the complete solubility of silicon carbide and aluminum nitride as derived by carbon reduction between about 0% and almost 100% aluminum nitride.

For each of the compositions listed in Table I, part of the samples were annealed or reacted in the absence of nitrogen. The aluminum oxycarbide forms a complete solid solution with silicon carbide between about 1% and 100 percent aluminum oxycarbide which is comparable to the data presented hereinbefore with respect to silicon carbide and aluminum nitride. Hence, a complete solid solution between silicon carbide and aluminum oxycarbide as well as among the three end members; silicon carbide, aluminum nitride and aluminum oxycarbide is formed.

At this stage, it should be indicated that the chemical analysis of the solid solutions of this invention is rather difficult and tends to be somewhat inaccurate. For reaction mixtures heated in nitrogen, it cannot be stated with certainty that aluminum nitride alone is in solid solution with the silicon carbide to the exclusion of aluminum oxycarbide or vice versa. For example, slight differences are observed between the x-ray diffraction patterns for aluminum nitride and aluminum oxycarbide and there is a corresponding observable difference in the diffraction patterns for solid solutions formed under a nitrogen atmosphere as compared to those formed in the absence of nitrogen. It is for this reason that small quantities of aluminum oxycarbide may exist in test samples of aluminum nitride-silicon carbide solid solutions.

When iron is present, in addition to aluminum nitride or aluminum oxycarbide, both alpha silicon carbide and beta silicon carbide appear in the x-ray diffraction pattern. Iron acts as a catalyst for the formation of beta silicon carbide and, therefore, has an extremely strong influence on the path of the reaction. Other elements such as copper, nickel, mangamese, chromimum, tantalum, calcium and platinum, for example, have a similar effect and may, therefore, be classified generally as impurities. For this reason, the formation of the silicon carbide-aluminum nitride-aluminum oxycarbide (SiCAlON) solid solution is completed more readily from raw materials free from iron or other impurities which influence the formation of beta or cubic siliconcarbide. Although the present reaction used Cabosil, it is readily recognized that other suitable sources of silica would also work as well if those sources are free of iron or other impurities. For example, sodium silicate is one source of silica that could be used in as much as the sodium oxide is readily reduced and volatilized from the reaction zone leaving silica in intimate contact with aluminum and carbon as described above.

EXAMPLE II

In this example, clay, a naturally occurring, intimate mixture of silica and alumina, was used as the basic raw material for producing the solid solution of this invention. The clay, a kaolinite clay ($2SiO_2 \, Al_2O_3 \, 2H_2O$), was boiled for two hours in a 10% solution of hydrochloric acid in order to dissolve any iron or other impurities. Thereafter, the clay was filtered, washed and dried. The dried clay was milled in a vibratory mill to a uniform fine powder.

Clay (285 grams) was dispersed in 300 milliliters water using a commercial dispersing agent (½% by weight) to achieve uniform dispersion of the clay in the water. Starch (840 grams) was mixed with the water/clay mixture. The resulting mixture was dried and coked for two hours at 500° C. in the absence of air.

The coked sample was reacted under a nitrogen atmosphere at 1500° C. for three hours in an electrical resistance furnace. The resulting solid solution of silicon carbide-aluminum nitride-aluminum oxycarbide was checked by x-ray diffraction techniques to assure that a solid solution was formed.

Importantly, the inclusion of iron or any other impurities (above about 0.1% by weight) inhibits the formation of a solid solution by causing the formation of two separate phases. For example, the presence of iron is well known for its characteristic of producing beta silicon carbide. The formation of beta silicon carbide is what is usually reported in the literature, particularly at the relatively low temperatures utilized in the present invention. Beta silicon carbide has a very distinctive x-ray diffraction pattern, commonly referred to in the literature as "beta peaks" and thereby provides a very simple test for reaction purity. In particular, a sample is readily tested to determine if a readily identifiable x-ray pattern is of "beta peaks" indicating the presence of beta silicon carbide.

Referring again now more particularly to FIG. 2, a graphical comparison of the x-ray diffraction patterns for solid solutions of aluminum nitride and silicon carbide is shown for various percentages of aluminum nitride. In particular, attention is directed to the shift in the diffraction pattern for the various ratios of aluminum nitride. This figure clearly proves that the solid solution exists since the pattern remains relatively constant but shifts with respect to an arbitrarily set base line or reference mark shown herein as a broken base line.

The base line, therefore, indicates a selected diffraction angle for the particular x-ray values used, and correspondingly, is an indication of the distance between the lattice planes. Accordingly, as the relative proportion of atoms change in the solid solution, the distance between the lattice planes also changes. This is shown by the shift of the diffraction pattern relative to the base line. However, if the compounds herein were to form separate phases rather than the solid solution of this invention, the x-ray diffraction pattern would clearly indicate two phases. As it is, the composition remains as a solid solution and the x-ray diffraction pattern remains relatively constant but merely shifts to indicate changes in the atoms ratios as set forth hereinbefore.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by U.S. Letters Patent is:

1. A refractory product comprising a solid solution comprising aluminum nitride, silicon carbide, and aluminum oxycarbide wherein said solid solution comprises at least 1% by weight aluminum nitride and at least 1% by weight aluminum oxycarbide.

2. The refractory product defined in claim 1 wherein the solid solution is particularly characterized by the substantial absence of impurities that tend to influence the formation of cubic structure silicon carbide wherein said impurities are less than 0.1% by weight.

3. A process for producing a refractory reaction product comprising silicon carbide, aluminum nitride, and aluminum oxycarbide in solid solution comprising:
   admixing a source of silicon, a source of aluminum, a source of nitrogen, and a source of carbon to form an intimate reaction mixture in such stoichiometric proportions that will yield a product containing at least 1% by weight aluminum nitride and at least 1% by weight aluminum oxycarbide in said solid solution; and
   heating said mixture at a temperature within the range on the order of about 1500° C. to 2000° C. until the solid solution is formed.

4. The process defined in claim 3 wherein the admixing step further comprises obtaining a fume-type silica as the silicon source and precipitating an aluminum salt as the aluminum source in a solution containing the silica to obtain an intimate dispersion of the silicon source with the aluminum source.

5. The process defined in claim 3 wherein the admixing step further comprises mixing a clay with a carbon source, the clay having less than 0.1% by weight impurities therein and providing silica as the silicon source and alumina as the aluminum source, the heating step comprising heating the clay and carbon source under a nitrogen atmosphere as the nitrogen source.

6. A process for producing a solid solution comprising silicon carbide, aluminum nitride, and aluminum oxycarbide comprising:
   obtaining a clay having silica and alumina;
   removing impurities from the clay;
   mixing a carbon source with the clay to form a reactant mixture;
   heating the reactant mixture under a nitrogen atmosphere to a temperature within the range on the order of about 1500° C. to 2000° C. until said solid solution is formed.

7. A solid solution comprising silicon carbide and at least 1% by weight aluminum oxycarbide.

8. The solid solution defined in claim 7 wherein the solid solution further comprises at least 1% by weight aluminum nitride.

9. The process defined in claim 3 wherein the solid solution is prepared from reactants comprising an intimate mixture of silica, carbon, and an aluminum source.

10. The process defined in claim 9 wherein the aluminum source is an aluminum salt.

11. The process defined in claim 9 wherein the aluminum source is alumina.

12. The process defined in claim 3 wherein the solid solution is prepared from reactants comprising an intimate mixture of clay from which impurities have been removed to less than 0.1% by weight and a carbon source, reacted under a nitrogen atmosphere.

13. The process defined in claim 3 wherein the solid solution is produced at a reaction temperature above about 1500° C. and below the decomposition temperatures of aluminum nitride and aluminum oxycarbide.

14. The solid solution defined in claim 3 wherein said solid solution is prepared from reactants comprising an intimate mixture of clay from which impurities have been removed to less than 0.1% by weight and a carbon source, said reactants having been reacted under an inert atmosphere.

* * * * *